US009893592B2

United States Patent
Hisamatsu

(10) Patent No.: US 9,893,592 B2
(45) Date of Patent: Feb. 13, 2018

(54) ROTATING ELECTRIC MACHINE

(71) Applicant: Mitsubishi Electric Corporation, Tokyo (JP)

(72) Inventor: Yoshiyuki Hisamatsu, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 232 days.

(21) Appl. No.: 14/904,563

(22) PCT Filed: Mar. 3, 2015

(86) PCT No.: PCT/JP2015/001105
§ 371 (c)(1),
(2) Date: Jan. 12, 2016

(87) PCT Pub. No.: WO2016/139695
PCT Pub. Date: Sep. 9, 2016

(65) Prior Publication Data
US 2017/0005542 A1 Jan. 5, 2017

Related U.S. Application Data

(60) Provisional application No. PCT/JP2015/001105, filed on Mar. 3, 2015.

(51) Int. Cl.
*H02K 7/106* (2006.01)
*F16D 65/18* (2006.01)
(Continued)

(52) U.S. Cl.
CPC ........... *H02K 7/106* (2013.01); *F16D 65/183* (2013.01); *H02K 7/08* (2013.01); *H02K 7/1025* (2013.01); *F16D 2121/22* (2013.01); *H01F 7/081* (2013.01)

(58) Field of Classification Search
CPC ...... B24B 23/028; B24B 55/00; H02K 7/104; H02K 7/145; H02K 7/08; H02K 7/106; H02K 7/1025; F16D 63/002; F16D 65/183
(Continued)

(56) References Cited

U.S. PATENT DOCUMENTS 5,446,722 A 8/1995 Kojima et al.
2009/0284105 A1 11/2009 Miyashita et al.

FOREIGN PATENT DOCUMENTS

JP 01-103134 A 4/1989
JP 04-118765 U 10/1992
(Continued)

OTHER PUBLICATIONS

International Search Report of PCT/JP2015/001105 dated Jun. 2, 2015.

*Primary Examiner* — Naishadh Desai
(74) *Attorney, Agent, or Firm* — Sughrue Mion, PLLC; Richard C. Turner

(57) ABSTRACT

A rotating electric machine includes: a rotation shaft; a bearing retaining the rotation shaft; an electromagnetic brake that is provided on an outer peripheral side of the rotation shaft and is located between the bearing and a rotor, the electromagnetic brake locking the rotation shaft during non-excitation and releasing the locking during excitation; a magnetic-flux shielding unit provided on an outer peripheral side of the electromagnetic brake; and a slidable contact unit that is provided so as to be in contact with the magnetic-flux shielding unit and the rotation shaft and comes into contact with the magnetic-flux shielding unit and the rotation shaft at least at two locations on the bearing side and the rotor side, wherein a magnetic field generated from the electromagnetic brake forms a closed circuit through the rotation (Continued)

shaft, the magnetic-flux shielding unit, and the slidable contact unit.

4 Claims, 2 Drawing Sheets

(51) Int. Cl.
*H02K 7/102* (2006.01)
*H02K 7/08* (2006.01)
*H01F 7/08* (2006.01)
*F16D 121/22* (2012.01)

(58) Field of Classification Search
USPC .......................................... 310/76, 77, 92, 93
See application file for complete search history.

(56) References Cited

FOREIGN PATENT DOCUMENTS

| | | |
|---|---|---|
| JP | 08-108845 A | 4/1996 |
| JP | 09-308171 A | 11/1997 |
| JP | 3040887 B2 | 5/2000 |
| JP | 2005-318717 A | 11/2005 |
| JP | 2009-247167 A | 10/2009 |
| JP | 4622487 B2 | 2/2011 |
| JP | 2011-050129 A | 3/2011 |

ROTATING ELECTRIC MACHINE

CROSS REFERENCE TO RELATED APPLICATIONS

This is a National Stage of International Application No. PCT/JP2015/001105 filed Mar. 3, 2015, the contents of which are incorporated herein by reference in its entirety.

FIELD

The present invention relates to a rotating electric machine that includes a magnetic shield provided on the outer peripheral side of an electromagnetic brake.

BACKGROUND

In the conventional rotating electric machines that have electromagnetic brakes, brake yokes are magnetized when a current is caused to flow through the electromagnetic coils forming the electromagnetic brakes. During such an excitation, in the electromagnetic brake, the armature is attracted to the brake yoke by the electromagnetic attraction force of the brake yoke. This magnetic attraction force creates an air gap between the rotating disk provided on the rotating shaft and the armature and thus the brake is released. Therefore, the rotor can freely rotate.

In contrast, when the current flowing through the electromagnetic coil is interrupted, the electromagnetic attraction force of the brake yoke disappears. During such a non-excitation, in the electromagnetic brake, the armature is pushed back by the elastic force of the spring and the armature presses the rotating disk against the braking disk. As a result, the brake acts and thus the rotor is locked and thus stops (for example, see Patent Literature 1).

CITATION LIST

Patent Literature

Patent Literature 1: Japanese Patent Application Laid-open No. 2011-50129 (p. 6, FIG. 1)

SUMMARY

Technical Problem

In the conventional rotating electric machines, leakage magnetic flux is generated from the excited electromagnetic brake, which is the source of magnetism, and this leakage magnetic flux is transferred to the rotation shaft through the bearing. This results in a problem in that the bearing, which is a magnetic body, is attracted toward the rotation shaft because of the leakage magnetic flux, and thus the bearing life is shortened and the bearing is damaged. Moreover, there is a problem in that the rotation shaft does not rotate smoothly because of the effect of the bearing that is magnetically attracted toward the rotation shaft, which causes vibration and noise.

The present invention has been achieved to solve the problems as above and an object of the present invention is to obtain a rotating electric machine that can reduce the leakage magnetic flux leaking to the rotation shaft from the electromagnetic brake, which is the source of magnetism.

Solution to Problem

The rotating electric machine according to an aspect of the present invention includes: a rotation shaft; a bearing that retains the rotation shaft; an electromagnetic brake that is provided on an outer peripheral side of the rotation shaft and is located between the bearing and a rotor, the electromagnetic brake locking the rotation shaft during non-excitation and releasing the locking during excitation; a magnetic-flux shielding unit provided on an outer peripheral side of the electromagnetic brake; and a slidable contact unit that is provided such that the slidable contact unit is in contact with the magnetic-flux shielding unit and the rotation shaft and comes into contact with the magnetic-flux shielding unit and the rotation shaft at least at two locations on the bearing side and the rotor side, wherein a magnetic field generated from the electromagnetic brake forms a closed circuit through the rotation shaft, the magnetic-flux shielding unit, and the slidable contact unit.

Advantageous Effects of Invention

According to the present invention, it is possible to reduce the adverse effect on the bearing due to the leakage magnetic flux from the electromagnetic brake; therefore, the bearing life improves. Moreover, the rotation shaft rotates smoothly; therefore, vibration and noise are significantly reduced.

DESCRIPTION OF EMBODIMENTS

First Embodiment

Figure 1:
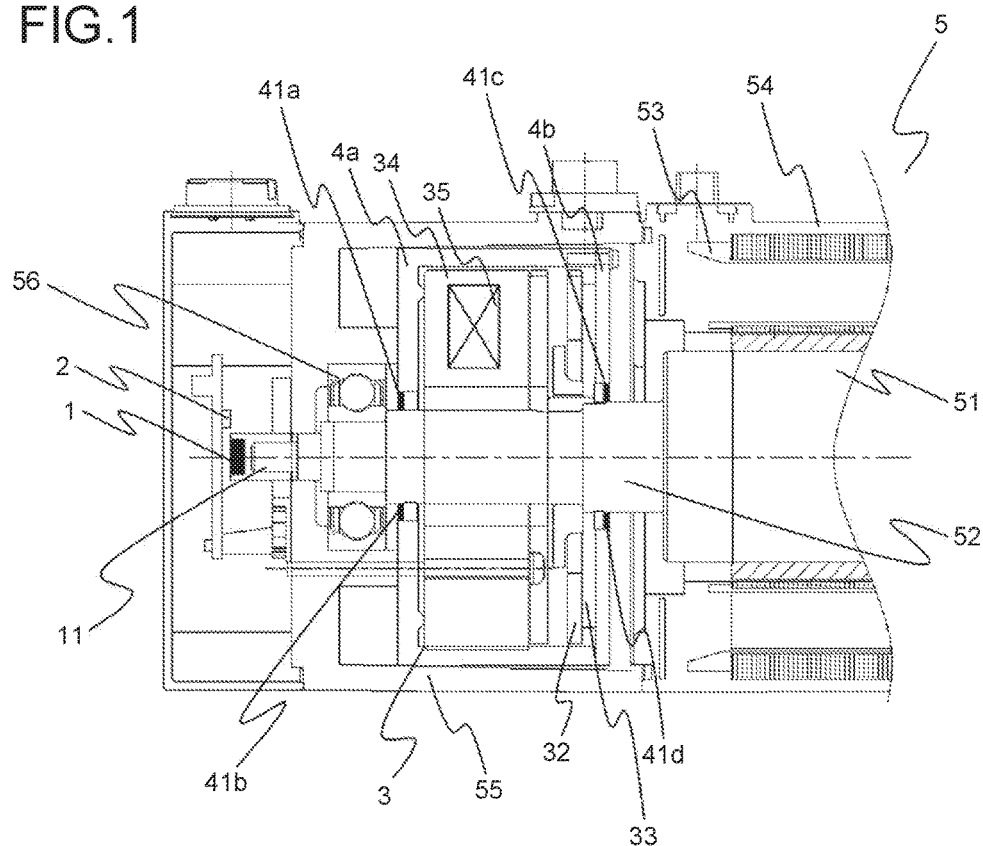
FIG. 1 is a diagram of a planar cross-sectional view of a rotating electric machine illustrating a first embodiment of the present invention.

FIG. 1 is a diagram of a planar cross-sectional view of a rotating electric machine illustrating a first embodiment of the present invention. As illustrated in FIG. 1, a rotating electric machine 5 includes a stator 53 around which a wire is wound; a frame 54 having a larger inside diameter than the outside diameter of the stator 53; a rotor 51 rotating in the stator 53; and an electromagnetic brake 3 that is used for gripping a rotation shaft 52 in the case of a power failure or the like and is provided on the outer peripheral side of the rotation shaft 52. An electromagnetic coil 35 is wound on the electromagnetic brake 3. When the electromagnetic coil 35 is excited by causing a current to flow therethrough, an electromagnetic attraction force is generated in a brake stator 34 itself, which is a component of the electromagnetic brake 3, and an armature 32 is attracted toward the brake stator 34 by overcoming the elastic force of the spring in the electromagnetic brake 3. As a result, the rotor 51 is released and thus rotates.

In contrast, when the current flowing through the electromagnetic coil 35 is interrupted so that the electromagnetic coil 35 is in a non-excited state, the electromagnetic attraction force of the brake stator 34 itself disappears in the electromagnetic brake 3, and the armature 32 is pushed back by the elastic force of the spring in the electromagnetic brake 3. As a result, the rotor 51 is braked and thus stops.

A sensor magnet 1, which is a magnetic encoder by which the rotation position of the rotating electric machine 5 is read, is attached to a boss 11, and the boss 11 is fitted into the rotation shaft 52, which is a component of the rotor 51. A magnetic-field detecting element 2 detects the magnetic field generated from the sensor magnet 1. The rotating electric machine 5 includes a bracket 55 and a bearing 56 on the counter-load side, which retains the rotation shaft 52. Magnetic shields 4a and 4b are magnetic-flux shielding units provided on the outer peripheral side of the electromagnetic brake 3. The magnetic shields 4a and 4b are located on the inner side of the bearing 56 in the rotating electric machine body. The bearing 56 is provided on the counter-load side of the rotation shaft 52. Specifically, the magnetic shields 4a and 4b are located between the bearing 56, which is provided on the counter-load side of the rotation shaft 52, and the bearing (not illustrated), which is provided on the load side of the rotation shaft 52. Brushes 41a to 41d are slidable contact units that are provided on the magnetic shields 4a and 4b and are slidably in contact with the rotation shaft 52. A non-magnetic body 33 is interposed between the electromagnetic brake 3 and the magnetic shield 4b.

Figure 2:
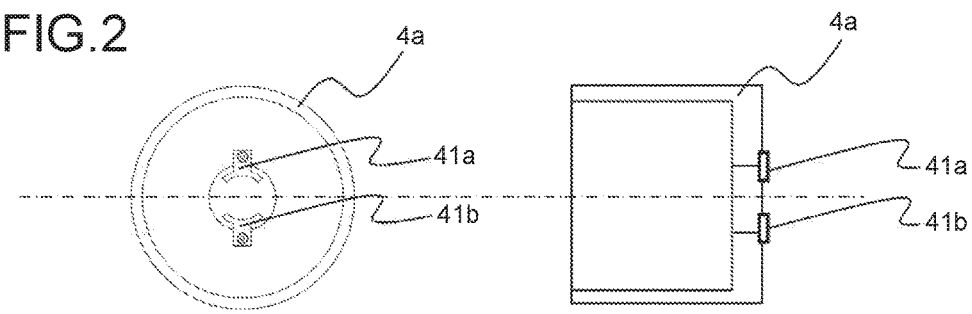
FIG. 2 is a diagram of a magnetic shield of the rotating electric machine illustrating the first embodiment of the present invention.
Figure 3:
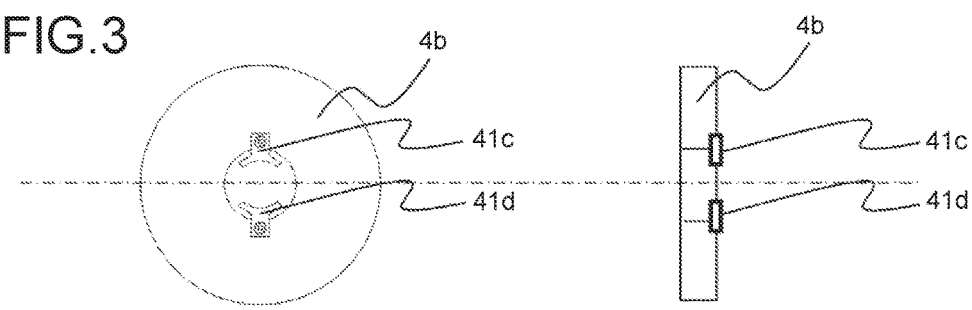
FIG. 3 is a diagram of a magnetic shield of the rotating electric machine illustrating the first embodiment of the present invention.

FIG. 2 and FIG. 3 are diagrams of the magnetic shields of the rotating electric machine illustrating the first embodiment of the present invention. As illustrated in FIG. 2 and FIG. 3, the brushes 41a to 41d are fixed to the magnetic shields 4a and 4b with screws or the like. The brushes 41a to 41d are such that the brush 41a and the brush 41b are provided on the counter-load side of the rotation shaft 52 and the brush 41c and the brush 41d are provided on the load side of the rotation shaft 52. The brushes 41a to 41d are in contact with the magnetic shields 4a and 4b and the rotation shaft 52.

The magnetic shield is composed of two types of magnetic shields, i.e., the cylindrical magnetic shield 4a with one end surface closed and the planar disk-shaped magnetic shield 4b, as illustrated in FIG. 2 and FIG. 3, respectively. With the conventional technologies, the electromagnetic brake 3 is fixed, with screws or the like, at fixing points provided in the bracket 55. In the first embodiment of the present invention, the electromagnetic brake 3 is fixed to the planar disk-shaped magnetic shield 4b. When the electromagnetic brake 3 is fixed to the magnetic shields 4a and 4b, first, the electromagnetic brake 3 is attached to the planar disk-shaped magnetic shield 4b with the non-magnetic body 33 therebetween. Next, the cylindrical magnetic shield 4a with one end surface closed is attached, with screws or the like, to the planar disk-shaped magnetic shield 4b to which the electromagnetic brake 3 is fixed. Finally, the magnetic shield 4b is fixed to the bracket 55 and the bracket 55 is attached to the frame 54 with screws or the like.

While the rotating electric machine is rotating, a current flows through the electromagnetic coil 35 forming the electromagnetic brake 3. In the excited state where the current flows through the electromagnetic coil 35, the magnetic field is generated in the brake stator 34, and the armature 32 is always attracted to the brake stator 34 side; therefore, the rotor 51 can rotate. However, the magnetic field generated in the brake stator 34 leaks to the rotation shaft 52 and a magnetic flux is generated. In the first embodiment of the present invention, the leakage magnetic flux that is generated because of the electromagnetic brake 3 and leaks to the rotation shaft 52 can be reduced by forming closed circuits through the rotation shaft 52, the magnetic shields 4a and 4b, and the brushes 41a to 41d fixed to the magnetic shields 4a and 4b. As a result, it is possible to reduce the adverse effect on the bearing 56 due to the leakage magnetic flux.

Moreover, although the magnetic flux also leaks to the rotation shaft 52 because of the stator 53, the leakage magnetic flux that leaks from the stator 53 can also be reduced by forming closed circuits through the rotation shaft 52, the magnetic shields 4a and 4b, and the brushes 41a to 41d fixed to the magnetic shields 4a and 4b. As a result, it is possible to reduce the adverse effect on the bearing 56 due to the leakage magnetic flux that leaks from the stator 53.

Figure 4:
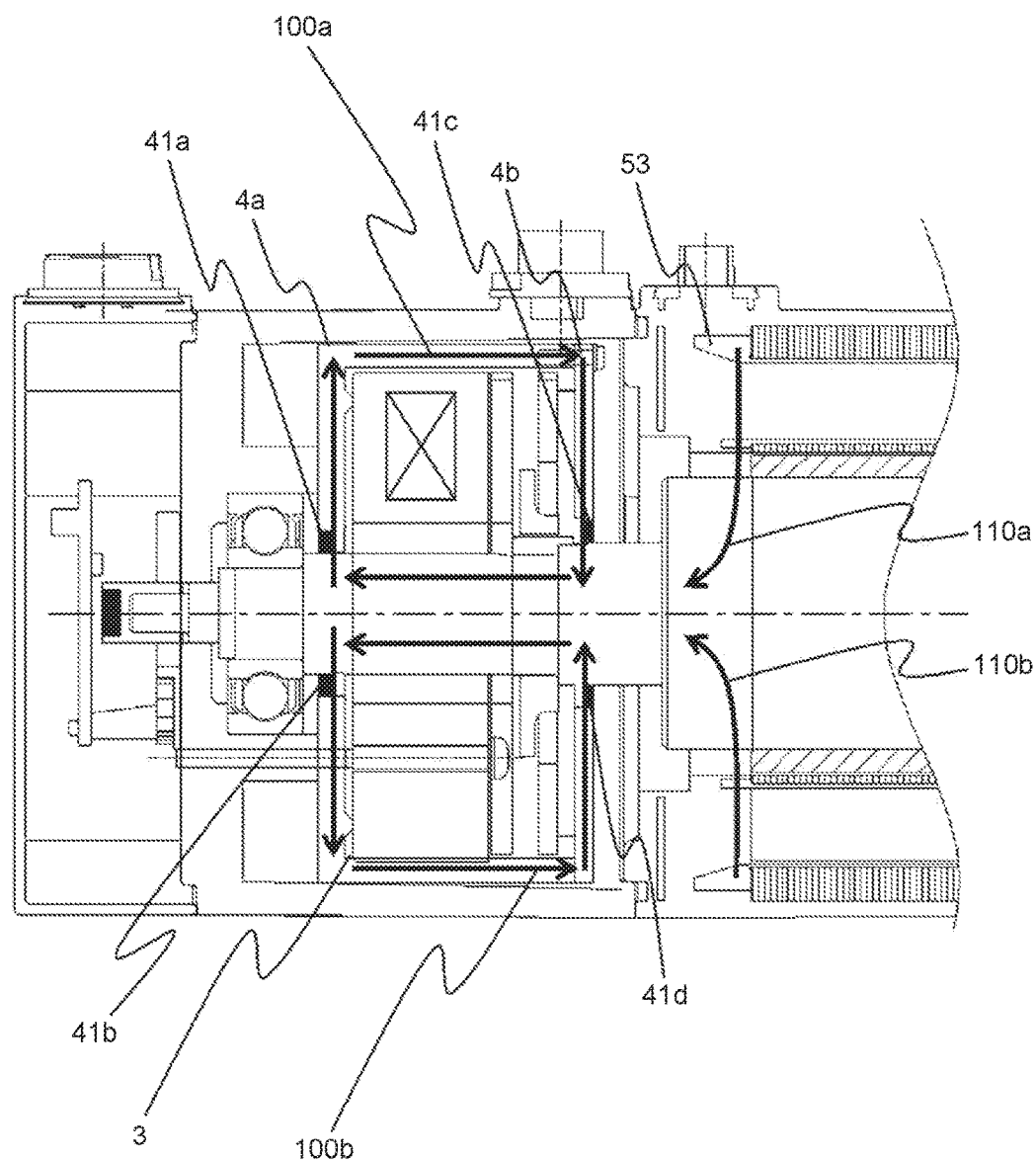
FIG. 4 is a diagram illustrating closed circuits for the leakage magnetic flux in the rotating electric machine illustrating the first embodiment of the present invention.

FIG. 4 is a diagram illustrating closed circuits for the leakage magnetic flux in the rotating electric machine illustrating the first embodiment of the present invention. As illustrated in FIG. 4, with regard to the leakage magnetic flux generated because of the electromagnetic brake 3, the amount of magnetic flux leaking to the bearing 56 can be reduced by forming two closed circuits: a closed circuit 100a, which is formed through the rotation shaft 52, the brush 41a, the magnetic shield 4a, the magnetic shield 4b, and the brush 41c; and a closed circuit 100b, which is formed through the rotation shaft 52, the brush 41b, the magnetic shield 4a, the magnetic shield 4b, and the brush 41d. As a result, it is possible to reduce the adverse effect on the bearing 56 due to the leakage magnetic flux from the electromagnetic brake 3; therefore, the life of the bearing 56 improves. Moreover, the rotation shaft 52 rotates smoothly; therefore, vibration and noise are significantly reduced.

Moreover, as illustrated in FIG. 4, with regard also to leakage magnetic fluxes 110a and 110b, which are generated because of the stator 53 and leak to the rotation shaft 52, the amount of magnetic flux leaking to the bearing 56 from the stator 53 can be reduced by forming two closed circuits: the closed circuit 100a, which is formed through the rotation shaft 52, the brush 41a, the magnetic shield 4a, the magnetic shield 4b, and the brush 41c; and the closed circuit 100b, which is formed through the rotation shaft 52, the brush 41b, the magnetic shield 4a, the magnetic shield 4b, and the brush 41d. As a result, it is possible to reduce the adverse effect on the bearing 56 due to the leakage magnetic fluxes 110a and 110b, which are generated because of the stator 53 and leak to the rotation shaft 52; therefore, the life of the bearing 56 further improves. Moreover, the rotation shaft 52 rotates smoothly; therefore, vibration and noise are significantly reduced.

Furthermore, in the first embodiment of the present invention, with regard also to the leakage magnetic flux that is generated because of the electromagnetic brake 3 and the stator 53 and leaks to the rotation shaft 52, the amount of magnetic flux leaking to the sensor magnet 1 can be reduced by forming two closed circuits: the closed circuits 100a and 100b. As a result, it is possible to reduce the adverse effect on the sensor magnet 1 due to the leakage magnetic flux leaking to the rotation shaft 52, thereby improving the accuracy of reading the rotation position of the rotating electric machine 5 with the magnetic-field detecting element 2.

REFERENCE SIGNS LIST 1 sensor magnet, 2 magnetic-field detecting element, 3 electromagnetic brake, 4a to 4b magnetic shield, 5 rotating electric machine, 11 boss, 32 armature, 33 non-magnetic body, 34 brake stator, 41a to 41d brush, 51 rotor, 52 rotation shaft, 53 stator, 54 frame, 55 bracket, 56 bearing, 100a to 100b closed circuit, 110a to 110b leakage magnetic flux.

The invention claimed is:

1. A rotating electric machine comprising:
    a rotation shaft;
    a bearing that retains the rotation shaft;
    an electromagnetic brake that is provided on an outer peripheral side of the rotation shaft and is located between the bearing and a rotor, the electromagnetic brake locking the rotation shaft during non-excitation and releasing the locking during excitation;
    a magnetic-flux shielding unit provided on an outer peripheral side of the electromagnetic brake; and
    a slidable contact unit that is provided such that the slidable contact unit is in contact with the magnetic-flux shielding unit and the rotation shaft and comes into contact with the magnetic-flux shielding unit and the rotation shaft at least at two locations on the bearing side and the rotor side, wherein
    a magnetic field generated from the electromagnetic brake forms a closed circuit through the rotation shaft, the magnetic-flux shielding unit, and the slidable contact unit.

2. The rotating electric machine according to claim 1, wherein the electromagnetic brake is fixed to the magnetic-flux shielding unit.

3. The rotating electric machine according to claim 1, wherein the magnetic-flux shielding unit is provided such that the magnetic-flux shielding unit covers the electromagnetic brake.

4. The rotating electric machine according to claim 1, wherein the slidable contact unit is a brush that provides line contact at two opposing locations on a cross-section of the rotation shaft.

* * * * *